(12) United States Patent
Montano et al.

(10) Patent No.: US 11,447,281 B2
(45) Date of Patent: Sep. 20, 2022

(54) MODULAR STAND-ALONE ULTRASONIC SEALING SYSTEM

(71) Applicant: Lako Tool & Manufacturing, Inc., Perrysburg, OH (US)

(72) Inventors: Louis Montano, Perrysburg, OH (US); Daniel Bomia, Perrysburg, OH (US); Ahmed Abdulateef, Perrysburg, OH (US); William Witzler, Perrysburg, OH (US)

(73) Assignee: LAKO TOOL & MANUFACTURING, INC., Perrysburg, OH (US)

( * ) Notice: Subject to any disclaimer, the term of this patent is extended or adjusted under 35 U.S.C. 154(b) by 39 days.

(21) Appl. No.: 17/176,915

(22) Filed: Feb. 16, 2021

(65) Prior Publication Data
US 2021/0253288 A1   Aug. 19, 2021

Related U.S. Application Data

(60) Provisional application No. 62/976,985, filed on Feb. 14, 2020.

(51) Int. Cl.
*B65B 51/22* (2006.01)
*B65B 51/14* (2006.01)
(Continued)

(52) U.S. Cl.
CPC .......... *B65B 51/225* (2013.01); *B65B 51/146* (2013.01); *B65B 51/303* (2013.01);
(Continued)

(58) Field of Classification Search
CPC .......... B65B 9/20; B65B 9/2028; B65B 9/213; B65B 51/146; B65B 51/225; B65B 51/30;
(Continued)

(56) References Cited

U.S. PATENT DOCUMENTS 4,373,982 A * 2/1983 Kreager et al. ........ B65B 51/225
156/203
4,713,047 A * 12/1987 Klinkel .................. B65B 51/303
493/203

(Continued)

FOREIGN PATENT DOCUMENTS

DE   102015223721 A1 * 6/2017 ............ B65B 51/26
EP       0255474 B1 * 7/1992 ........... B65B 9/2028
(Continued)

*Primary Examiner* — Stephen F. Gerrity
(74) *Attorney, Agent, or Firm* — Devlin Law Firm LLC (57) ABSTRACT

A modular stand-alone ultrasonic bag sealing system has an ultrasonic sealer assembly that utilizes a sonotrode and an anvil that are actuated together to form a bag seal in a bag configured therebetween. The system also has an integral control system that is physically configured on the housing of the system and runs a control software. The control software is configured to control the ultrasonic sealer assembly to close and open to seal bags. The controller may have a plurality of signal inputs for receiving input signals from a bag feeder assembly or from an auxiliary machine. The system may also have an integral bag feeder assembly that has an index roller for feeding a bag to the ultrasonic sealer assembly. The system is configured for quick integration into a process line and has versatility of communication through the control software and signal inputs and outputs.

15 Claims, 5 Drawing Sheets

(51) Int. Cl.
 *B65B 57/04* (2006.01)
 *B65B 51/30* (2006.01)
 *B65B 57/02* (2006.01)
 *B65B 51/10* (2006.01)
 *B65B 9/20* (2012.01)
 *B65B 9/213* (2012.01)

(52) U.S. Cl.
 CPC .............. *B65B 57/02* (2013.01); *B65B 57/04* (2013.01); *B65B 9/20* (2013.01); *B65B 9/2028* (2013.01); *B65B 9/213* (2013.01); *B65B 51/30* (2013.01); *B65B 2051/105* (2013.01)

(58) Field of Classification Search
 CPC ....... B65B 51/303; B65B 57/02; B65B 57/04; B65B 2051/105
 USPC .................. 53/505, 551, 552, 374.8, DIG. 2; 156/358, 359, 580.1
 See application file for complete search history.

(56) References Cited

U.S. PATENT DOCUMENTS

| | | | | |
|---|---|---|---|---|
| 4,759,170 | A | * | 7/1988 | Sawa et al. ............. B65B 9/213 53/551 |
| 6,276,419 | B1 | * | 8/2001 | Maruyama .......... B29C 66/8227 156/583.8 |
| 8,720,168 | B2 | * | 5/2014 | Kamigaito et al. ... B65B 51/225 53/550 |
| 8,858,742 | B2 | * | 10/2014 | Spicer et al. ........ B23K 20/106 156/359 |
| 9,517,852 | B2 | * | 12/2016 | Beauvy et al. ....... B65B 51/225 |
| 2003/0168162 | A1 | * | 9/2003 | Eile et al. ........... B29C 66/8167 156/289 |
| 2005/0193689 | A1 | * | 9/2005 | Basque ................... B65B 51/30 53/551 |
| 2008/0091299 | A1 | * | 4/2008 | Yoshikawa et al. .... B65B 9/213 700/242 |
| 2011/0054660 | A1 | * | 3/2011 | Kiesler et al. ........ B65B 51/225 700/110 |
| 2011/0120622 | A1 | * | 5/2011 | Moeglich ............ B29C 66/7373 156/580.1 |
| 2012/0125521 | A1 | * | 5/2012 | Dersch et al. ........ B65B 51/225 156/73.1 |

FOREIGN PATENT DOCUMENTS

| | | | | |
|---|---|---|---|---|
| EP | 1772381 | A1 * | 4/2007 | ........... B65B 51/225 |
| EP | 2724840 | A1 * | 4/2014 | ........... B65B 51/225 |
| JP | 05213304 | A * | 8/1993 | |
| JP | 2017105509 | A * | 6/2017 | ........... B65B 51/225 |
| JP | 2017128368 | A * | 7/2017 | ........... B65B 51/26 |
| KR | 20140141438 | A * | 12/2014 | ........... B65B 51/225 |

\* cited by examiner

MODULAR STAND-ALONE ULTRASONIC SEALING SYSTEM

CROSS REFERENCE TO RELATED APPLICATIONS

This application claims the benefit of priority to U.S. provisional patent application No. 62/976,985, filed on Feb. 14, 2020; the entirety of which is hereby incorporated by reference herein.

BACKGROUND OF THE INVENTION

Field of the Invention

The invention relates to a modular stand-alone ultrasonic sealing unit having a plurality of interface components for quick implementation and retrofitting into production lines.

Background

Flexible packaging for food items, in general, must be sealed around the food item to form a unit of food within the flexible packaging. Known methods for sealing flexible packing film around food items include cold glue-based sealing methods, thermal-based sealing methods, and ultrasonic sealing methods. Ultrasonic sealing methods generally involve the transfer of ultrasonic energy into the packaging material typically to heat the packaging material beginning from the inside (center) of two joined pieces of the packaging material and radiating outwardly, causing the packaging material to partially melt and adhere to form a seal. As noted in U.S. Pat. No. 6,574,944, herein incorporated by reference, ultrasonic sealing is known to offer certain advantages over traditional cold glue-based or thermal-based sealing. In comparison to cold glue or thermal heat sealing for example, ultrasonic sealing typically provides more reliable seal integrity. For example, adhesive sealing can be challenging because an inadequate amount of pressure may result that does not sufficiently activating the cold glue. Similar seal integrity problems exist in thermal sealing systems, such as product contamination in the seal area. Contamination in the seal area reduces the ability to achieve hermetically sealed packages. Ultrasonic sealing does not present some of the challenges and complexities needed to achieve quality seals when using adhesive and thermal sealing. Also, ultrasonic sealing does not have the complexities required to create seals required by thermal or adhesive sealing. Furthermore, adhesive-specific problems such as channeling are not typically encountered in ultrasonic sealing. Typically, because ultrasonic sealing heats and melts the packaging material together directly, the seal integrity is greater than that of cold glue.

Another advantage in ultrasonic sealing of packaging material as opposed to cold glue is that an ultrasonic seal is typically much narrower than the seal width for cold glue. This reduction in the seal width may reduce the amount of packaging material required to package a food product by reducing the proportion of the packaging material used in to form the seal. The reduction in the amount of packaging material may lead to a reduction in overall conversion costs due to reducing the total consumption of packaging material.

Ultrasonic sealing may also have a number of advantages over traditional thermal-based sealing. A first advantage ultrasonic sealing may have over thermal sealing is speed. The injection of ultrasonic energy directly into the packaging material causes the packaging material to melt and seal more quickly than thermal-based sealing.

Heretofore sealing equipment used to form seals on flexible packaging around food items has been specifically designed and deployed as a component intended for a specific flexible packaging system made by one OEM. These systems are often referred to in the industry as a "form, fill and seal" machine ("FFS machine"), which may include vertical and horizontal baggers. In the FFS machine concept, the form, fill and seal components are all specifically designed for the same machine. When a producer/manufacturer desires to change one of these components, a unique retrofit and update of the entire machine is necessary to adapt a new component part to work with the existing machine.

For a food packaging company (that is not the original equipment manufacturer of an FFS machine) needing to retool its FFS machine to replace the sealing unit, the company will confront significant engineering costs and challenges. For example, to move from thermal sealing components to ultrasonic sealing components, an engineer typically needs to travel to the facility where the FFS machine is located, to fully reverse engineer the existing seal mechanism on the FFS machine. In addition, an electrical engineer must review the FFS machine control and how it operates during the sealing process to determine if the customer requirements can be met. This engineering work may involve a two to three day visit to document the engineering details and typically requires taking the machine out of service/production during this period.

After the initial documentation visit, the engineers will attempt to design a conversion that will fit the existing FFS machine drive mechanism. In addition to the mechanical design, the electrical engineer will attempt to provide a conversion design to allow the new sealing component to communicate with the existing machine control.

SUMMARY OF THE INVENTION

The invention is directed to a modular ultrasonic sealing unit having a plurality of interface components for quick implementation and retrofitting into production lines. The prior art fails to describe a universal, standalone modular ultrasonic sealing unit. An exemplary modular ultrasonic sealing unit may be plugged into a variety of different types of FFS machines, by a variety of OEMs, with minimal engineering required to allow the sealing unit to operate as a module of the FFS machine.

The modular ultrasonic sealing unit can be used with multiple style vertical or horizontal bagger designs from different original equipment manufacturers (OEMs) so that a unique conversion is not required for each application in which an FFS machine sealing unit upgrade is desired. Example OEMs of such FFS equipment include: Ilapak, Hayssen, Bosch, Triangle, Sandiacre, Matrix, Viking Masek, Woodman, each offering uniquely designed FFS machines for which the standalone/modular ultrasonic sealing unit of the present invention may be deployed.

Each standalone/modular ultrasonic sealing unit will have an onboard control to meet a customers specifications, such as speed (ppm), seal force/pressure, seal timing, and precise setup. The onboard control device will include the ability to control all of these parameters without the need to modify the existing FFS machine control and may be designed to operate cooperatively with the existing FFS machine control.

Having stock modular ultrasonic sealing assembly designs on hand will reduce the engineering effort needed to perform the conversion of an FFS machine to adapt to a new sealing technology. The standardization of the design will also create production efficiencies and reduce waste and manufacturing costs for the modular sealing unit.

Notably, the advantages of designing a universal, stand-alone/modular sealing unit designed for application into a variety of FFS machines is not only an improvement applicable to ultrasonic sealing assemblies but also to other sealing designs, including more traditional thermal/heat sealing designs.

According to the new standalone modular sealing unit contemplated herein, the entire sealing process will be more precise because the sealing unit will have been specifically designed to work with an onboard controller rather than a main controller for the entire FFS machine.

The sealing process of the standalone sealing units will be repeatable and their operation will be consistent from one unit to the next for a broad range of FFS machines made by a variety of OEMs.

The modular unit can be pre-assembled and tested and in stock prior to shipping. The standalone sealing unit may include features that were not a part of the prior sealing unit design, such as a usage monitoring technology to more easily facilitate operational error detection or threshold usage for replaceable parts (e.g., counters).

An exemplary modular stand-alone ultrasonic bag sealing system comprises an ultrasonic sealer assembly comprising a sonotrode, an anvil and an actuator to actuate at least one of the sonotrode or the anvil to press the sonotrode and the anvil together to form a bag seal in a bag configured therebetween. In an exemplary embodiment, both the anvil and the sonotrode are actuated together to form a bag seal therebetween. A pressure sensor may be configured to measure a measured pressure reached when the sonotrode and the anvil are pressed together to form said bag seal. If a threshold pressure is not achieved, then the seal of the bag may be compromised and this bag may be indicated for further inspection or scrap.

An exemplary modular stand-alone ultrasonic bag sealing system has an integral control system comprising a computer such as a microprocessor, that runs a control software. The control software is configured to control the ultrasonic sealer assembly to close and open the ultrasonic sealer to seal bags. The controller may have a plurality of signal inputs for receiving input signals from a bag feeder assembly or from an auxiliary machine. The exemplary modular stand-alone ultrasonic bag sealing system may have a plurality of signal inputs, as the types of signals may be different types including, but not limited to, analog, digital, a voltage range, and the like. The exemplary modular stand-alone ultrasonic bag sealing system is designed for easy integration into a wide array of processing systems and therefore the plurality of inputs aids in quick retrofitting. Likewise, the exemplary modular stand-alone ultrasonic bag sealing system may have a plurality of signal outputs, as the types of signals may be different types, including, but not limited to, analog, digital, a voltage range, and the like. The control software of the control system may be block logic software.

The modular stand-alone ultrasonic sealing system may comprise an integral bag feeder assembly comprising a bag feeder having an index roller for feeding a bag to the ultrasonic sealer assembly. The modular stand-alone ultrasonic sealing system may comprise an integral web film unwind system and forming shoulder used to form a tube with a vertical back seal that may be thermally sealed, further this tube may be cross-sealed ultrasonically to form a bag once filled with product. The bag feeder assembly may also have a bag sensor that senses a position of the bag and may have a signal output to send a signal to the control system that the bag is in a seal or product fill position. The integral control system may be configured to control both the bag feeder and the ultrasonic sealer assembly. The actuator of the ultrasonic sealer assembly may be initiated when the control system receives a signal from the bag feeder that that the bag is in a seal position.

An exemplary modular stand-alone ultrasonic sealing system may have a number of sensors that provide input to the controller including, but not limited to, a sonotrode temperature sensor that measures a temperature of the sonotrode, an anvil temperature sensor that measures a temperature of the anvil, and as described above, a pressure sensor may measure the pressure of the anvil against the sonotrode. The measured values may be provided to the control system and recorded for future evaluation and/or for quality control purposes.

An exemplary modular stand-alone ultrasonic sealing system may provide an output signal from the signal output to an auxiliary machine, such as a product dispenser. The product may be dispensed into the bag when the product dispenser receives said output signal from the signal output.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
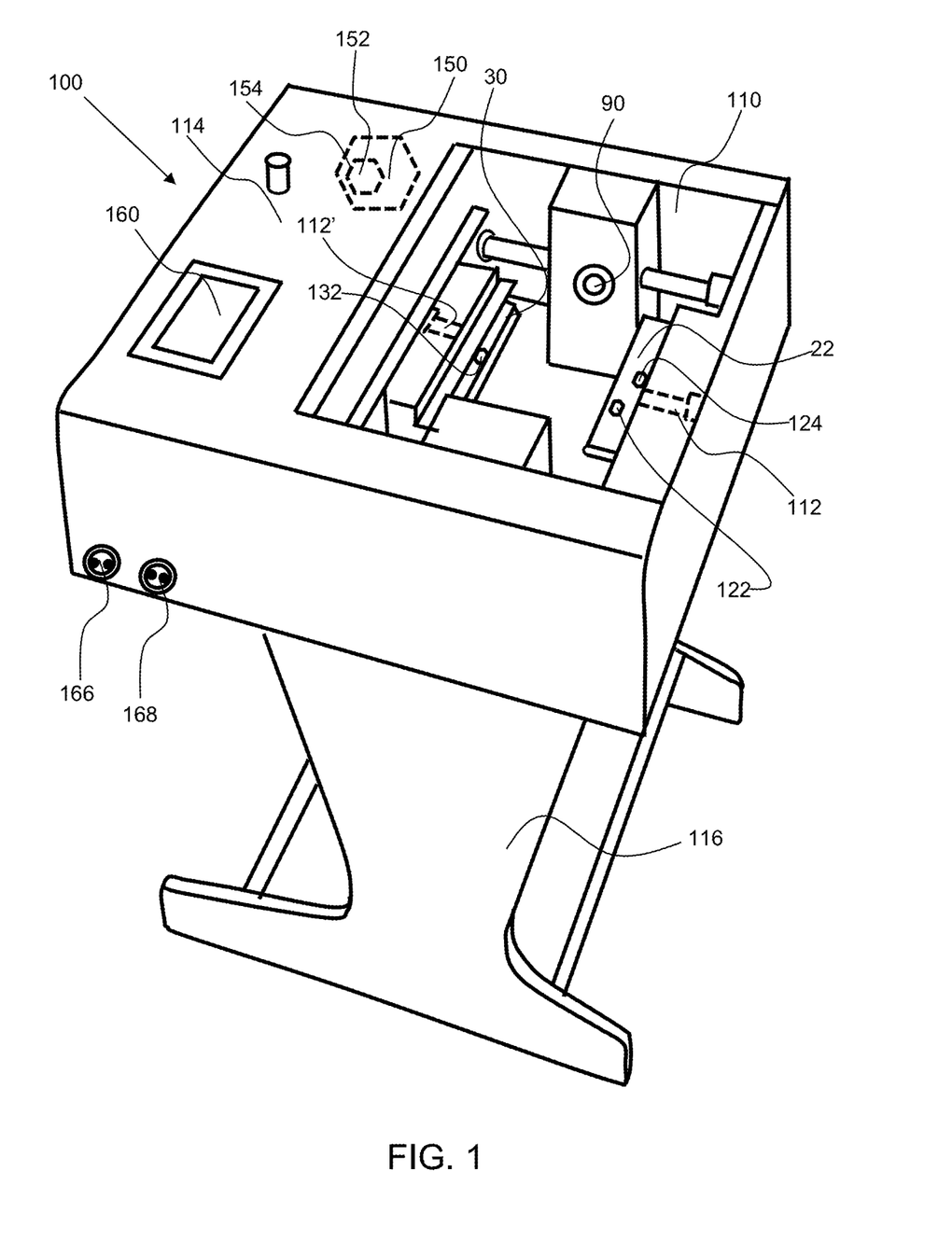
FIG. 1 shows perspective view of an exemplary modular stand-alone ultrasonic bag sealing system having a ultrasonic sealer assembly that utilizes an anvil and a sonotrode to form a seal in a bag and a control system that is integral to the unit.

As shown in FIG. 1, a modular stand-alone ultrasonic bag sealing system 100 comprises an ultrasonic sealer assembly 110 having a sonotrode 22 and an anvil 30. An actuator 112, and/or 112' is configured to move the sonotrode and anvil together to produce a sealing pressure to seal a bag. The modular stand-alone ultrasonic bag sealing system 100 is stand-alone and has a support base 116 that may be adjustable in height to accommodate various process lines it may be configured into.

A pressure sensor 124 is configured to measure a measured pressure between the anvil and sonotrode. Also, the ultrasonic sealer assembly may include an anvil temperature sensor 132 and a sonotrode temperature sensor 122. The temperature of the components may be measured in order to maintain them within an upper and lower threshold. Repeated cycles of sealing can lead to the pressures increasing and this can then result in bag seals that receive too much heat. A cooling system may be employed to maintain the temperature of the anvil and/or sonotrode within these threshold temperatures. A bag sensor 90 may be configured to detect when a bag in between the anvil and the sonotrode and/or detect a reference on the bag to indicate that the bag is in a seal position. The bag may have a reference that is detected by the bag sensor, such as a line or emblem or a bar code including a linear bar code, matrix bar code or Quick Response (QR) code.

The modular stand-alone ultrasonic bag sealing system 100 has an integral control system 150, comprising a computer 152, or microprocessor 154 that runs a control software. The control system is integral in that it is physically configured on the housing 114 of the modular stand-alone ultrasonic bag sealing system. The control system may also include a user input 160 for setting parameters of the system. The ultrasonic sealer assembly may also have a signal input 166 for receiving an input signal from a bag feeder assembly or other auxiliary machine, such as a product filler. The actuator of the ultrasonic sealer assembly may not be activated until an input signal is received through this signal input 166. A bag feeder may index a bag and then send an input signal to the ultrasonic sealer assembly to activate sealing of the bag. Likewise, the ultrasonic sealer assembly may also have a signal output 168 for sending an output signal to a bag feeder assembly or other auxiliary machine, such as a product filler. The ultrasonic sealer assembly may send an output signal to a bag feeder that a first seal is complete and this may initiate the bag feeder to further index the bag for subsequent sealing or cutting of the bag. In another example, the ultrasonic sealer assembly sends a signal to a product filler machine to fill the bag with product. The ultrasonic sealer assembly may then receive a signal that the bag is filled from the product filler machine and proceed to seal the bag with the ultrasonic sealer.

Figures 2, 3:
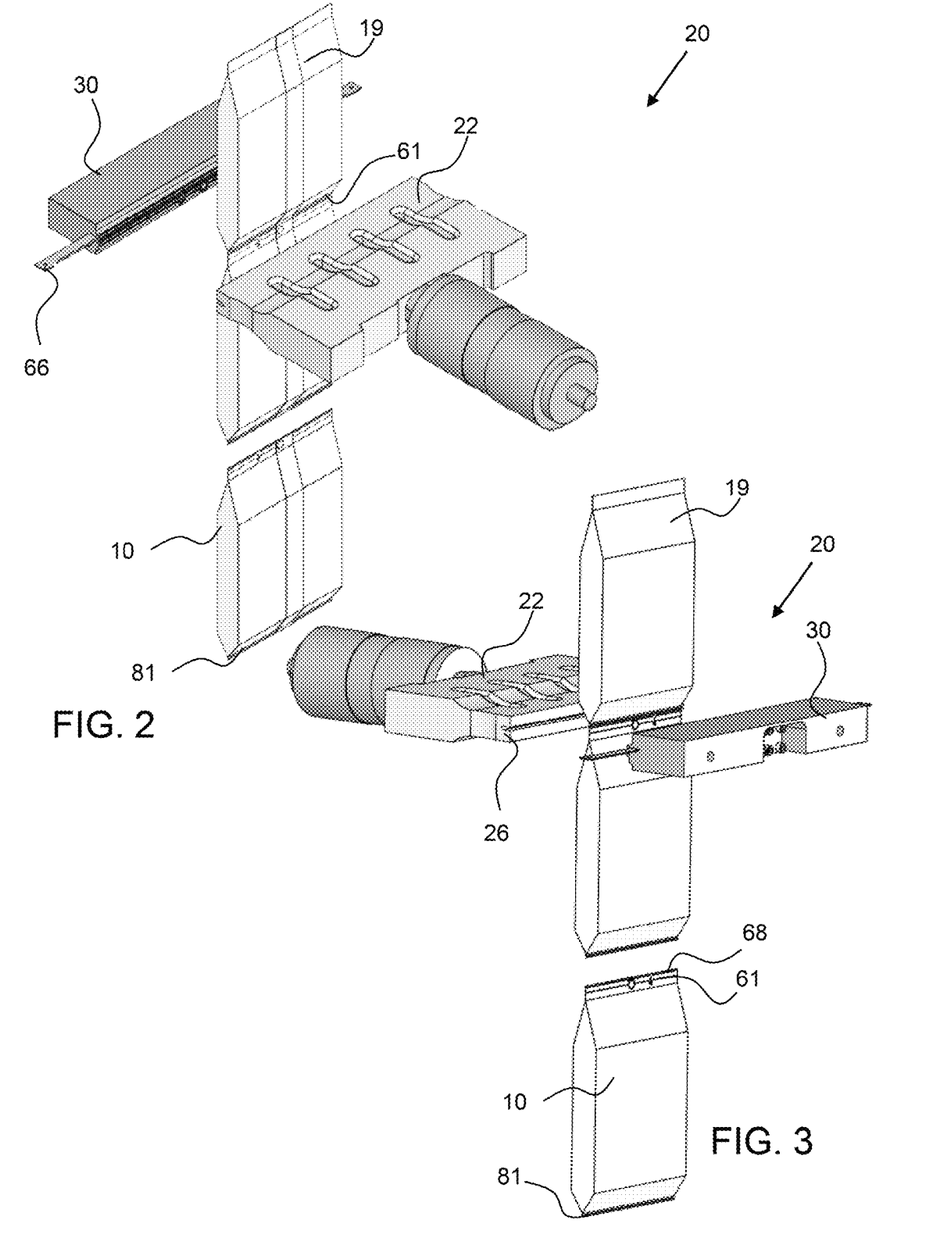
FIG. 2 shows a perspective view of a bag finishing system comprising a sonotrode that engages with an anvil to seal the bag and also cut or separate a bag from a roll of bags.
FIG. 3 shows a perspective view of a bag finishing system comprising a sonotrode that engages with an anvil to seal the bag and also cut or separate a bag from a roll of bags.
Figure 4:
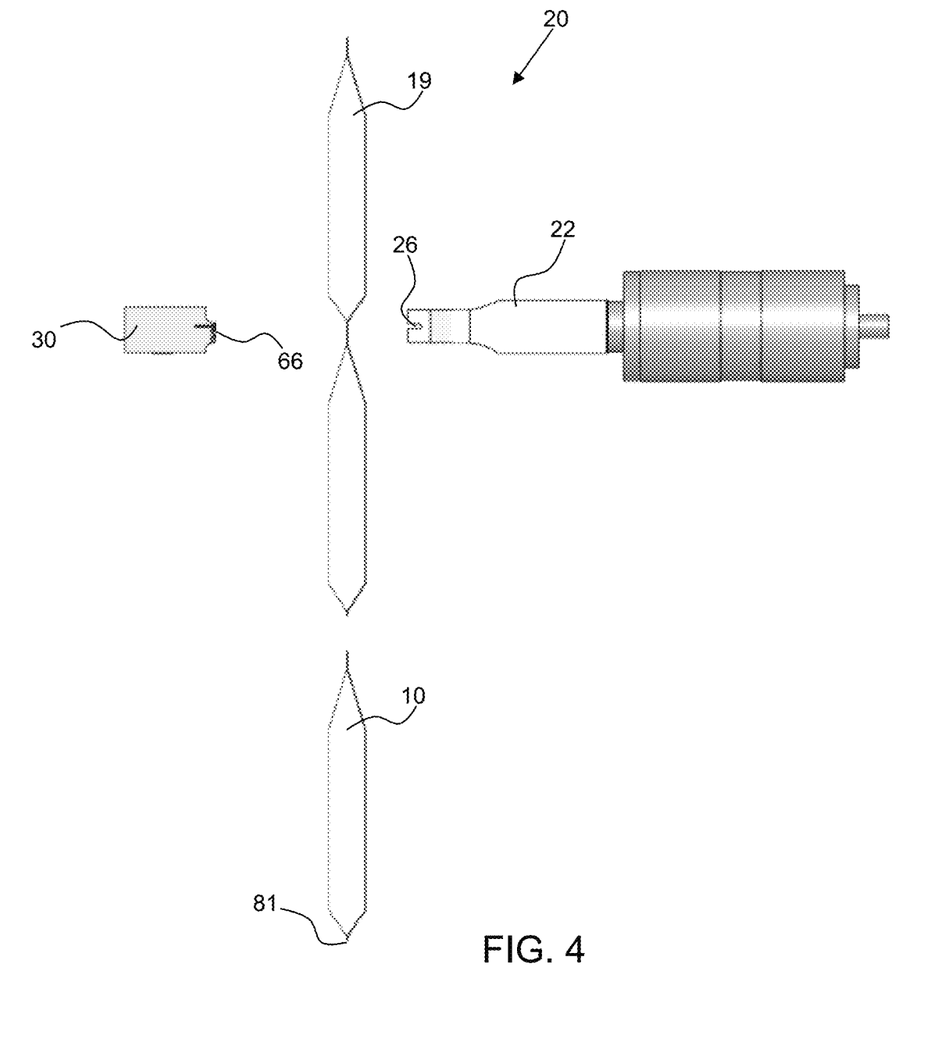
FIG. 4 shows a side view of an exemplary bag finishing system comprising a sonotrode having a knife receiver slot and an anvil having a knife that is pneumatically actuated through the bag and into the knife slot to cut the bag from the bag roll.

Referring now to FIGS. 2 to 4, an ultrasonic bag sealing assembly 20 comprises a sonotrode 22, or ultrasonic horn, that engages with an anvil 30 to seal the package, a bag, and also cut or separate an ultrasonic sealed bag 10 from a roll of bags 19. As shown in FIGS. 2 and 3, the anvil forms a hole punch seal in the ultrasonic sealed package 10. The ultrasonic sealed package 10 has a barrier seal 61 and a skirt seal 68 as well as a bottom seal 81. The bottom seal of a package may be formed by the anvil as the barrier and skirt seal are formed in the adjacent package or bag. Also, the knife 66 configured in the anvil may engage with the knife slot 26 of the sonotrode to separate the sealed package from the adjacent package still coupled with the string of bags. As shown in FIG. 4, the anvil has a knife 66 that extends into a knife slot 26 when the anvil 30 is engaged with the sonotrode 22. The knife will separate or cut the sealed package from the following package. This single operation therefore may seal and also separate packages in a single step.

Figure 5:
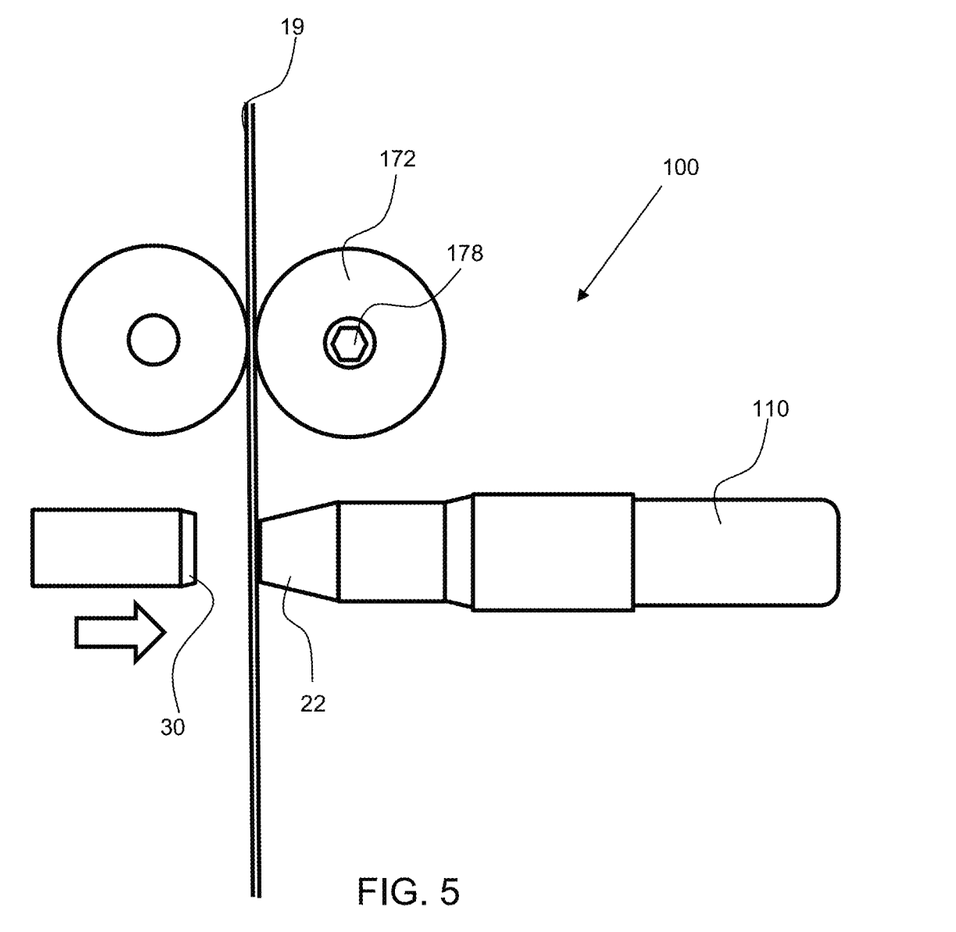
FIG. 5 shows a side view of an exemplary modular stand-alone ultrasonic bag sealing system having both an ultrasonic sealer assembly and a bag feeder system, wherein the integral control system controls both systems to work together.

As shown in FIG. 5, the modular stand-alone ultrasonic bag sealing system 100 comprises both the ultrasonic sealer assembly 110 having a sonotrode 22 and an anvil 30, and the bag feeder system, having an index roller 172 to index the roll of bags 19 between the anvil and sonotrode. A bag position sensor 178 may be configured to determine a position of a bag. The sensor may be integral with the index roller which may employ servo motors that accurately index a programed amount. The index rollers may be controlled by the integral control system 150 and may receive an output signal from the control system from the signal output shown in FIG. 1. Also, the control system may receive an input signal from the bag sealing system which may indicate that the roll of bags is in a seal position. The control system may be integral 150 and be physical coupled to the modular stand-alone ultrasonic bag sealing system as shown.

Figure 6:
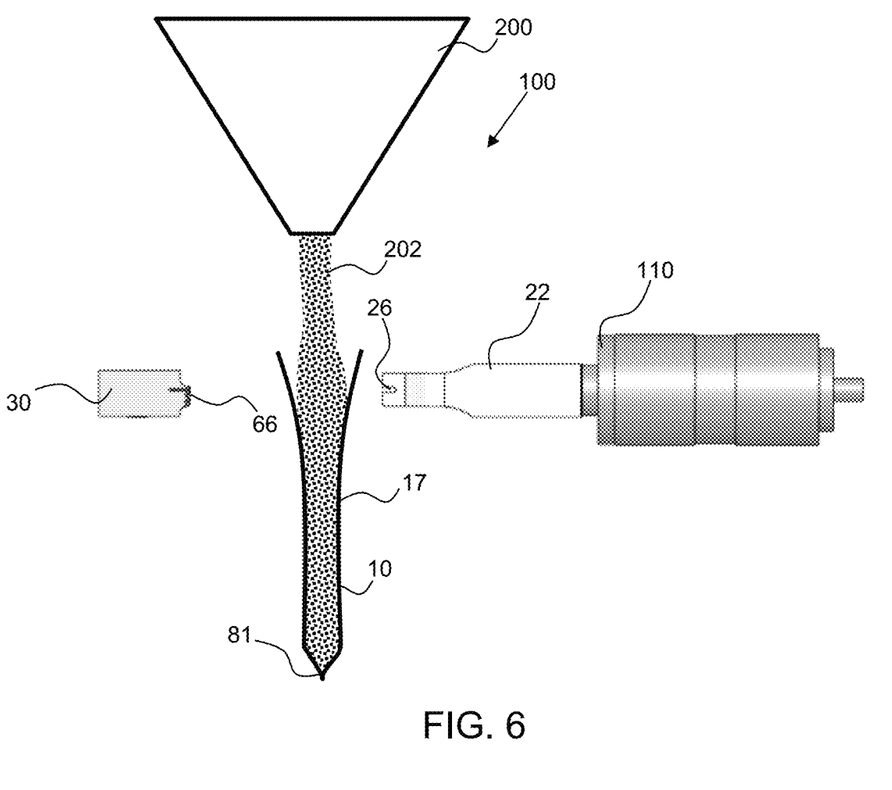
FIG. 6 shows a side view of an exemplary modular stand-alone ultrasonic bag sealing system having an ultrasonic sealer assembly coupled with an auxiliary machine, a product feeder that fills product into a bag.

FIG. 6 shows an exemplary modular stand-alone ultrasonic bag sealing system 100 having an ultrasonic sealer assembly 110 coupled with an auxiliary machine 200, a product feeder that fills product 202 into a bag 17. The integral control system may send an output signal to the product feeder after the bottom barrier seal 81 is formed and the bag has been indexed, such as by an integral bag feeder of the modular stand-alone ultrasonic bag sealing system 100 to a product fill position, as shown. After the product is dispensed into the bag, the modular stand-alone ultrasonic bag sealing system receive an input signal from the product feeder that the product has been dispensed and then the ultrasonic sealer assembly 110 may seal the bag to form a barrier seal, as shown in FIGS. 2 and 3.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A modular stand-alone ultrasonic bag sealing system comprising:
   a) an ultrasonic sealer assembly comprising:
      i) a sonotrode;
      ii) an anvil;
      iii) an actuator to actuate at least one of the sonotrode or the anvil to press the sonotrode and the anvil together to form a bag seal in a bag configured therebetween;
      iv) a pressure sensor to measure a measured pressure reached when the sonotrode and the anvil are pressed together to form said bag seal;
   b) a control system comprising;
      i) a computer;
      ii) a control software;
   wherein the control software is configured to control the ultrasonic sealer assembly and wherein the measured pressure is recorded;
   c) a bag feeder assembly comprising:
      i) a bag feeder comprising an index roller for feeding a bag to the ultrasonic sealer assembly;
   wherein the bag feeder has a bag sensor that senses a position of said bag;
   wherein the control software is configured to control both the bag feeder and the ultrasonic sealer assembly.

2. The modular stand-alone ultrasonic sealing system of claim 1, wherein the actuator of the ultrasonic sealer assembly is initiated when the control system receives a signal from the bag feeder that that the bag is in a seal position.

3. The modular stand-alone ultrasonic sealing system of claim 1, further comprising a sonotrode temperature sensor that measures a temperature of the sonotrode.

4. The modular stand-alone ultrasonic sealing system of claim 1, wherein the temperature of the sonotrode is recorded by the control system.

5. The modular stand-alone ultrasonic sealing system of claim 1, further comprising an anvil temperature sensor that measures a temperature of the anvil.

6. The modular stand-alone ultrasonic sealing system of claim 1, wherein the temperature of the anvil is recorded by the control system.

7. The modular stand-alone ultrasonic sealing system of claim 1, wherein the control software is block logic software.

8. A modular stand-alone ultrasonic bag sealing system comprising:
   a) an ultrasonic sealer assembly comprising:
      i) a sonotrode;
      ii) an anvil;
      iii) an actuator to actuate at least one of the sonotrode or the anvil to press the sonotrode and the anvil together to form a bag seal in a bag configured therebetween;
      iv) a pressure sensor to measure a measured pressure reached when the sonotrode and the anvil are pressed together to form said bag seal;
   b) a control system comprising;
      i) a computer;
      ii) a control software;
   wherein the control software is configured to control the ultrasonic sealer assembly and wherein the measured pressure is recorded;
   wherein the control system has a signal output that provides an output signal to an auxiliary machine; and
   wherein the auxiliary machine is a product dispenser and wherein a product is dispensed into the bag when the product dispenser receives said output signal from the signal output.

9. The modular stand-alone ultrasonic sealing system of claim 8, wherein the control system has a plurality of signal outputs for sending a first output signal and a second output signal, wherein the first and second output signals are different types of output signals.

10. A modular stand-alone ultrasonic bag sealing system comprising:
    a) an ultrasonic sealer assembly comprising:
       i) a sonotrode;
       ii) an anvil;
       iii) an actuator to actuate at least one of the sonotrode or the anvil to press the sonotrode and the anvil together to form a bag seal in a bag configured therebetween;
       iv) a pressure sensor to measure a measured pressure reached when the sonotrode and the anvil are pressed together to form said bag seal;
    b) a control system comprising;
       i) a computer;
       ii) a control software;
    wherein the control software is configured to control the ultrasonic sealer assembly and wherein the measured pressure is recorded;
    wherein the control system has a signal input to receive an input signal from an auxiliary machine;
    wherein the actuator of the ultrasonic sealer assembly is initiated when the control system receives an input signal from the auxiliary machine; and
    wherein the auxiliary machine is a bag feeder.

11. The modular stand-alone ultrasonic sealing system of claim 10, wherein the control system has a plurality of signal inputs for receiving a first input signal and a second input signal, wherein the first and second input signals are different types of input signals.

12. The modular stand-alone ultrasonic sealing system of claim 10, wherein the auxiliary machine is a product fill machine.

13. A modular stand-alone ultrasonic bag sealing system comprising:
    a) an ultrasonic sealer assembly comprising:
       i) a sonotrode;
       ii) an anvil;
       iii) an actuator to actuate at least one of the sonotrode or the anvil to press the sonotrode and the anvil together to form a bag seal in a bag configured therebetween;

iv) a pressure sensor to measure a measured pressure reached when the sonotrode and the anvil are pressed together to form said bag seal;

b) a bag feeder assembly comprising:
i) a bag feeder comprising an index roller for feeding a bag to the ultrasonic sealer assembly;

wherein the bag feeder has a bag sensor that senses a position of said bag c) a control system comprising;
i) a computer;
ii) a control software;

wherein the control software is configured to control both the bag feeder and the ultrasonic sealer assembly; and wherein the actuator of the ultrasonic sealer assembly is initiated when the control system receives a signal from the bag feeder that that the bag is in a seal position.

14. The modular stand-alone ultrasonic bag sealing system of claim 13, wherein the control system has a plurality of signal inputs for receiving a first input signal and a second input signal, wherein the first and second input signals are different types of input signals.

15. The modular stand-alone ultrasonic bag sealing system of claim 14, wherein the control system has a plurality of signal outputs for sending a first output signal and a second output signal, wherein the first and second output signals are different types of output signals.

* * * * *